(12) United States Patent
Barefoot et al.

(10) Patent No.: US 8,415,013 B2
(45) Date of Patent: *Apr. 9, 2013

(54) STRENGTHENED GLASS ARTICLES AND METHODS OF MAKING

(75) Inventors: Kristen L Barefoot, Corning, NY (US); James Joseph Price, Corning, NY (US); Jose Mario Quintal, Campbell, NY (US); Ronald Leroy Stewart, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,684

(22) Filed: Apr. 20, 2012

(65) Prior Publication Data

US 2012/0202040 A1 Aug. 9, 2012

Related U.S. Application Data

(60) Continuation of application No. 13/289,294, filed on Nov. 4, 2011, which is a division of application No. 12/537,393, filed on Aug. 7, 2009, now Pat. No. 8,075,999.

(60) Provisional application No. 61/087,324, filed on Aug. 8, 2008.

(51) Int. Cl.
*C03C 21/00* (2006.01)

(52) U.S. Cl.
USPC ............... 428/410; 501/68; 501/69; 501/70; 428/220

(58) Field of Classification Search ............ 428/410
See application file for complete search history.

(56) References Cited

U.S. PATENT DOCUMENTS

| | | | |
|---|---|---|---|
| 3,592,726 A | 7/1971 | Blizard | |
| 3,640,694 A | 2/1972 | Giddings et al. | |
| 3,776,709 A | 12/1973 | Melling et al. | |
| 3,890,128 A | 6/1975 | Melling et al. | |
| 3,954,487 A * | 5/1976 | Gliemeroth et al. | .......... 428/410 |
| 4,113,458 A | 9/1978 | Cross | |
| 4,124,733 A | 11/1978 | Melling et al. | |
| 4,156,755 A | 5/1979 | Rinehart | |

(Continued)

FOREIGN PATENT DOCUMENTS

| | | |
|---|---|---|
| EP | 2177485 A1 | 4/2010 |
| GB | 1018890 | 2/1966 |

(Continued)

OTHER PUBLICATIONS

Varshneya, A., "Fundamentals of Inorganic Glasses," $2^{nd}$ Edition, Society of Glass Technology, 2006, p. 513-521.
U.S. Appl. No. 12/392,577, filed Feb. 25, 2009, by Matthew John Dejneka et al., entitled "Fining Agents for Silicate Glasses".
U.S. Appl. No. 12/393,241, filed Feb. 26, 2009, by Matthew John Dejneka et al., entitled "Ion-Exchanged, Fast Cooled Glasses".

(Continued)

*Primary Examiner* — David Sample
(74) *Attorney, Agent, or Firm* — Robert P. Santandrea (57) ABSTRACT

A strengthened glass article having a central tension that is below a threshold value above which the glass exhibits frangible behavior. The central tension varies non-linearly with the thickness of the glass. The glass article may be used as cover plates or windows for portable or mobile electronic devices such as cellular phones, music players, information terminal (IT) devices, including laptop computers, and the like.

24 Claims, 4 Drawing Sheets

U.S. PATENT DOCUMENTS

| | | | |
|---|---|---|---|
| 4,872,896 | A | 10/1989 | LaCourse et al. |
| 6,361,101 | B1 | 3/2002 | Yoshizawa |
| 6,713,180 | B1 | 3/2004 | Torr et al. |
| 6,790,799 | B2 | 9/2004 | Kuroki et al. |
| 6,810,688 | B1 | 11/2004 | Duisit et al. |
| 7,635,521 | B2 | 12/2009 | Aitken et al. |
| 7,666,511 | B2 | 2/2010 | Ellison et al. |
| 7,727,917 | B2 | 6/2010 | Shelestak et al. |
| 7,833,919 | B2 | 11/2010 | Danielson et al. |
| 8,075,999 | B2 | 12/2011 | Barefoot et al. |
| 8,158,543 | B2 | 4/2012 | Dejneka et al. |
| 8,168,295 | B2 | 5/2012 | Murata |
| 8,187,987 | B2 * | 5/2012 | Amin et al. ............... 501/69 |
| 2004/0071960 | A1 | 4/2004 | Weber et al. |
| 2005/0090377 | A1 | 4/2005 | Shelestak et al. |
| 2008/0286548 | A1 | 11/2008 | Ellison et al. |
| 2009/0079671 | A1 | 3/2009 | Nishi et al. |
| 2009/0142568 | A1 | 6/2009 | Dejneka et al. |
| 2009/0197048 | A1 | 8/2009 | Amin et al. |
| 2009/0197088 | A1 * | 8/2009 | Murata ................ 428/410 |
| 2009/0202808 | A1 | 8/2009 | Glaesemann et al. |
| 2009/0220761 | A1 | 9/2009 | Dejneka et al. |
| 2009/0298669 | A1 | 12/2009 | Akiba et al. |
| 2009/0325776 | A1 * | 12/2009 | Murata ................ 501/66 |
| 2010/0009154 | A1 | 1/2010 | Allan et al. |
| 2010/0009454 | A1 * | 1/2010 | Mao et al. ................ 436/94 |
| 2010/0028607 | A1 | 2/2010 | Lee et al. |
| 2010/0035745 | A1 * | 2/2010 | Murata ................ 501/66 |
| 2010/0119846 | A1 | 5/2010 | Sawada |
| 2011/0014475 | A1 * | 1/2011 | Murata ................ 428/410 |
| 2011/0091704 | A1 | 4/2011 | Akiba et al. |
| 2011/0129650 | A1 | 6/2011 | Shashidhar et al. |
| 2011/0274916 | A1 | 11/2011 | Murata |
| 2011/0293942 | A1 | 12/2011 | Cornejo et al. |
| 2012/0011981 | A1 | 1/2012 | Brown |
| 2012/0034435 | A1 | 2/2012 | Borrelli et al. |
| 2012/0094084 | A1 | 4/2012 | Fisher et al. |
| 2012/0171497 | A1 | 7/2012 | Koyama et al. |
| 2012/0236526 | A1 | 9/2012 | Weber |

FOREIGN PATENT DOCUMENTS

| | | | |
|---|---|---|---|
| GB | 1253284 | | 11/1971 |
| JP | 11328601 | A | 11/1999 |
| JP | 2002060242 | | 2/2002 |
| JP | 2004131314 | | 4/2004 |
| JP | 2008001590 | | 1/2008 |
| JP | 2008115071 | | 5/2008 |
| JP | 2008115072 | | 5/2008 |
| JP | 2008195602 | A * | 8/2008 |
| JP | 2009057271 | A | 3/2009 |
| JP | 2009084075 | | 4/2009 |
| RU | 2116983 | C1 | 8/1998 |
| WO | WO 2008044694 | A1 * | 4/2008 |
| WO | 2008143999 | A1 | 11/2008 |
| WO | 2009108339 | A2 | 9/2009 |
| WO | 2010005578 | A1 | 1/2010 |
| WO | 2010101961 | A2 | 9/2010 |
| WO | 2011069338 | A1 | 6/2011 |
| WO | 2011103798 | A1 | 9/2011 |
| WO | 2011103799 | A1 | 9/2011 |
| WO | 2011144024 | A1 | 11/2011 |
| WO | 2012037094 | A2 | 3/2012 |
| WO | 2012074983 | A1 | 6/2012 |
| WO | 2012118612 | A1 | 9/2012 |
| WO | 2012125857 | A1 | 9/2012 |

OTHER PUBLICATIONS

U.S. Appl. No. 12/510,599, filed Jul. 28, 2009, by Christopher M. Lee et al., entitled "Dual Stage Ion Exchange for Chemical Strengthening of Glass".

U.S. Appl. No. 12/500,650, filed Jul. 10, 2009, by Douglass C. Allan et al., entitled "Glass With Compressive Surface for Consumer Applications".

Glass et al., "New Glass Technologies for Enhanced Architectural Surety Engineered Stress Profiles (DPS) in Soda-Lime-Silica Glass", SAND2000-3001, Unlimited Release, Dec. 2000.

Japanese Application 2011522066 Office Action dated Mar. 21, 2012.

International Preliminary Report on Patentability and Search Report for International Application No. PCT/US2009/004531 dated Feb. 8, 2011.

Deriano, S. et al.; Physical and Mechanical Properties of a New Borosilicate Glass; Ann. Chim. Sci. Mat.; 2003; pp. 55-62; vol. 28; Elsevier SAS.

Deubener, J. et al.; Crack tip fracture toughness of base glasses for dental restoration glass-ceramics using crack opening displacements; Journal of the Mechanical Behavior of Biomedical Materials; Oct. 2011; pp. 1291-1298; vol. 4; Elsevier.

Gross, T.M. et al.; A glass with high crack initiation load; Role of fictive temperature-independent mechanical properties; Journal of Non-Crystalline Solids; Apr. 15, 2009; pp. 563-568; vol. 355; Elsevier.

Hornberger, H. et al.; Microstructure of a high strength alumina glass composite; Journal of Materials Research; Apr. 1996; pp. 855-858; vol. 11, No. 4; Materials Research Society.

Ito, S.; Structural Study of Mechanical Behavior of Glass; Journal of the Ceramic Society of Japan; 2004; pp. 477-485; vol. 112.

Kato, Y. et al.; Effect of densification on crack initiation under Vickers indentation test; Journal of Non-Crystalline Solids; Aug. 2010; pp. 1768-1773; vol. 356; Elsevier B.V.

Nakai, T. et al.; Effect of aluminum ions on intrinsic sub-critical crack growth in metaphosphate glasses; Journal of Non-Crystalline Solids; Jul. 2007; pp. 2250-2257; vol. 353; Elsevier B.V.

Rizkalla, A. et al.; Effect of Nonbridging Oxygens on the Fracture Toughness of Synthesized Glasses; Br. Ceram. Trans. J.; 1992; pp. 12-15; vol. 91.

Seal, A. et al.; Effect of phase separation on the fracture toughness of $SiO_2$-$B_2O_3$-$Na_2O$ glass; Bull. Mater. Sci.; Aug. 2005; pp. 457-460; vol. 28, No. 5; Indian Academy of Sciences.

Sehgal, J. et al.; Brittleness of glass; Journal of Non-Crystalline Solids; Aug. 1999; pp. 126-132; vol. 253; Elsevier Science B.V.

Sehgal, J. et al.; A New Low-Brittleness Glass in the Soda-Lime-Silica Glass Family; Journal of the American Ceramic Society; Sep. 1998; pp. 2485-2488; vol. 81, Issue 9.

Simmons, C. et al.; Effects of Phase Separation on Crack Growth in Borosilicate Glass; Journal of Non-Crystalline Solids; May-Jun. 1980; pp. 503-508; vol. 38 & 39; North-Holland Publishing Company.

Sugimura, S. et al.; Compositional Dependence of Mechanical Properties in Aluminosilicate, Borate and Phosphate Glasses; Journal of the Ceramic Society of Japan; 2002; pp. 1103-1106; vol. 110 [12].

Taniguchi, T. et al.; Deformation and fracture of soda-lime-silica glass under tension by molecular dynamics simulation; Journal of the Ceramic Society of Japan; 2008; pp. 885-889; vol. 116 [8]; The Ceramic Society of Japan.

West, J. et al.; Part III Five- and six-fold ring contraction models; Journal of Materials Science; Dec. 15, 1995; pp. 6281-6287; vol. 30; Chapman & Hall.

Wilantewicz, T. et al.; Vickers Indentation Fracture in Optical Glass Compositions; Ceramic Transactions; 2007; pp. 131-151; vol. 199; The American Ceramic Society.

Yoshida, S. et al.; Crack Grown in the High Crack Velocity Region for Binary Sodium Silicate Glasses; Journal of hte Ceramic Society of Japan; 2000; pp. 948-951; vol. 108 [10].

Yoshida, S. et al.; Crack growth behavior of zinc tellurite glass with or without sodium oxide; Journal of Non-Crystalline Solids; Jan. 2001; pp. 44-50; vol. 279; Elsevier Science B.V.

Yoshida, S. et al.; Sub-critical crack growth in sodium germanate glasses; Journal of Non-Crystalline Solids; Feb. 2003; pp. 28-34; vol. 316; Elsevier Science B.V.

Yoshida, S. et al.; Crack initiation behavior of sodium aluminosilicate glasses; Journal of Non-Crystalline Solids; Sep. 15, 2004; pp. 37-43; vol. 344; Elsevier B.V.

Decision of Rejection pertaining to Japanese Patent Application No. 2011-522066 dated Oct. 16, 2012.

Office Action pertaining to European Patent Application No. 09 789 083.4 dated Oct. 30, 2012.

* cited by examiner

STRENGTHENED GLASS ARTICLES AND METHODS OF MAKING

CROSS-REFERENCE TO RELATED APPLICATIONS

This application is a continuation of U.S. application Ser. No. 13/289,294, filed Nov. 4, 2011, which is a divisional of U.S. application Ser. No. 12/537,393 filed Aug. 07, 2009 (now U.S. Pat. No. 8,075,999) and claims the benefit of U.S. Provisional Patent Application No. 61/087,324, filed Aug. 8, 2008.

BACKGROUND

Chemically strengthened glasses have been identified for use in hand held devices, such as mobile phones, media players, and other devices, as well as other applications requiring transparency, high strength and abrasion resistance. However, such glasses are potentially susceptible to frangible behavior—i.e., the glass energetically fragments into a large number of small pieces when impacted with sufficient penetration force.

SUMMARY

Strengthened glasses having a central tension below a threshold value, above which the glass exhibits frangible behavior, are provided and described herein. The central tension varies nonlinearly with the thickness of the glass. The glasses may be used as cover plates or windows for portable or mobile electronic communication and entertainment devices, such as cellular phones, music players; and information terminal (IT) devices, such as laptop computers and the like.

Accordingly, one aspect of the disclosure is to provide a strengthened glass article having a thickness $t \leq 0.75$ mm and comprising an outer region and an inner region, wherein the inner region is under a central tension CT, and wherein $-15.7 \cdot t(mm) + 52.5$ (MPa) $< CT(MPa) \leq -38.7$ (MPa/mm)·ln(t)(mm) + 48.2 (MPa), wherein CT is expressed in megaPascals (MPa) and t is expressed in millimeters (mm).

Another aspect of the disclosure is to provide a strengthened glass article having a thickness $t \leq 0.75$ mm and comprising an outer region and an inner region under a central tension CT, which is expressed in megaPascals (MPa), wherein $CT(MPa) > -15.7$ (MPa/mm)·t(mm) + 52.5 (MPa). The strengthened glass article is substantially non-frangible when subjected to a point impact that is sufficient to break the strengthened glass article.

Yet another aspect of the disclosure is to provide a strengthened glass article having a thickness $t \leq 0.75$ mm and comprising an outer region, the outer region extending from a surface of the article to a depth of layer DOL within the article, wherein the outer region is under a compressive stress CS and an inner region, wherein the inner region is under a central tension CT, and wherein CT (MPa) $> -15.7$ (MPa/mm)·t(mm) + 52.5 (MPa), and wherein the strengthened glass article has a frangibility index of less than 3.

These and other aspects, advantages, and salient features will become apparent from the following detailed description, the accompanying drawings, and the appended claims.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range, as well as any sub-ranges therebetween.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Frangible behavior (also referred to herein as "frangibility") refers to extreme fragmentation behavior of a glass article. Frangible behavior is the result of development of excessive internal or central tension CT within the article, resulting in forceful or energetic fragmentation of the article upon fracture. In thermally tempered, laminated, or chemically strengthened (e.g., strengthened by ion exchange) glass articles, frangible behavior can occur when the balancing of compressive stresses (CS) in a surface or outer region of the glass article (e.g., a plate or sheet) with tensile stress in the center of the glass plate provides sufficient energy to cause multiple crack branching with ejection or "tossing" of small glass pieces and/or particles from the article. The velocity at which such ejection occurs is a result of the excess energy within the glass article, stored as central tension CT.

The frangibility of a glass article is a function of central tension CT and compressive stress CS. In particular, the central tension CT within a glass article can be calculated from the compressive stress CS. Compressive stress CS is measured near the surface (i.e., within 100 μm), giving a maximum CS value and a measured depth of the compressive stress layer (also referred to herein as "depth of layer" or "DOL"). Compressive stress and depth of layer are measured using those means known in the art. Such means include, but are not limited to, measurement of surface stress (FSM) using commercially available instruments such as the FSM-6000, manufactured by Luceo Co., Ltd. (Tokyo, Japan), or the like, and methods of measuring compressive stress and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2008), entitled "Standard Test Method for Measurement of Glass Stress-Optical Coefficient," the contents of which are incorporated herein by reference in their entirety, and a bulk cylinder method. The relationship between CS and central tension CT is given by the expression:

$$CT=(CS \cdot DOL)/(t-2DOL) \quad (1),$$

wherein t is the thickness of the glass article. Unless otherwise specified, central tension CT and compressive stress CS are expressed herein in megaPascals (MPa), whereas thickness t and depth of layer DOL are expressed in millimeters. The depth of the compression layer DOL and the maximum value of compressive stress CS that can be designed into or provided to a glass article are limited by such frangible behavior. Consequently, frangible behavior is one consideration to be taken into account in the design of various glass articles.

Frangible behavior is characterized by at least one of: breaking of the strengthened glass article (e.g., a plate or sheet) into multiple small pieces (e.g., $\leq 1$ mm); the number of fragments formed per unit area of the glass article; multiple crack branching from an initial crack in the glass article; violent ejection of at least one fragment a specified distance (e.g., about 5 cm, or about 2 inches) from its original location; and combinations of any of the foregoing breaking (size and density), cracking, and ejecting behaviors. As used herein, the terms "frangible behavior" and "frangibilty" refer to those modes of violent or energetic fragmentation of a strengthened glass article absent any external restraints, such as coatings, adhesive layers, or the like. While coatings, adhesive layers, and the like may be used in conjunction with the strengthened glass articles described herein, such external restraints are not used in determining the frangibility or frangible behavior of the glass articles.

Figure 1A:
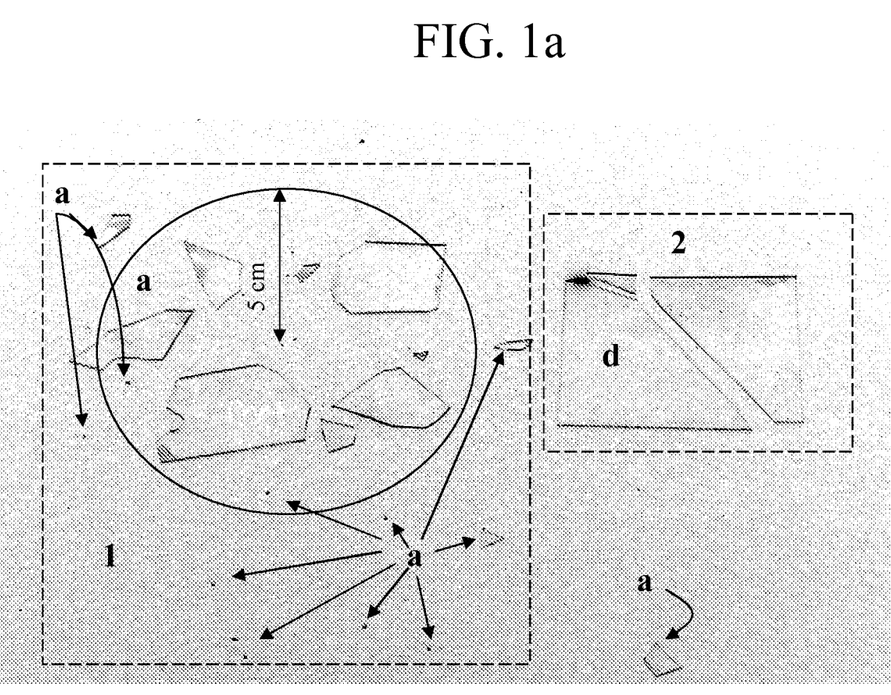
FIG. 1a is a photograph showing strengthened glass articles 1) exhibiting frangible behavior upon fragmentation; and 2) exhibiting non-frangible behavior upon fragmentation.
Figure 1B:
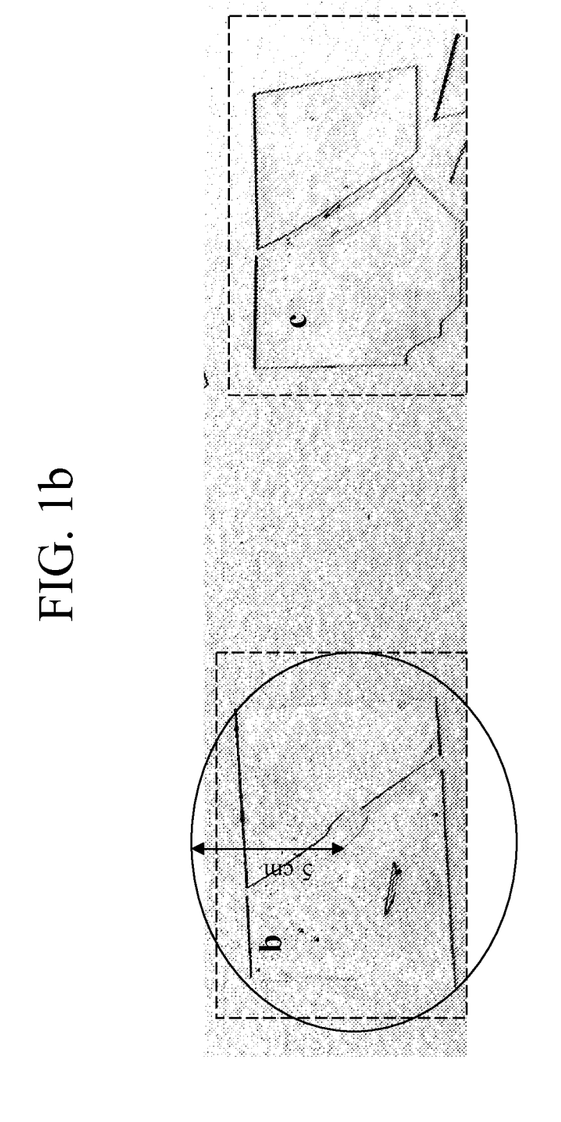
FIG. 1b is a photograph showing strengthened glass sheets that exhibit non-frangible behavior upon fragmentation.

FIGS. 1a and 1b illustrate examples of frangible behavior and non-frangible behavior of strengthened glass articles upon point impact with a sharp indenter. The point impact test that is used to determine frangible behavior includes an apparatus that is delivered to the surface of the glass article with a force that is just sufficient to release the internally stored energy present within the strengthened glass article. That is, the point impact force is sufficient to create at least one new crack at the surface of the strengthened glass sheet and extend the crack through the compressive stress CS region (i.e., depth of layer) into the region that is under central tension CT. The impact energy needed to create or activate the crack in a strengthened glass sheet depends upon the compressive stress CS and depth of layer DOL of the article, and thus upon the conditions under which the sheet was strengthened (i.e., the conditions used to strengthen a glass by ion exchange). Otherwise, each ion exchanged glass plate shown in FIGS. 1a and 1b was subjected to a sharp dart indenter contact sufficient to propagate a crack into the inner region of the plate, the inner region being under tensile stress. The force applied to the glass plate was just sufficient to reach the beginning of the inner region, thus allowing the energy that drives the crack to come from the tensile stresses in the inner region rather than from the force of the dart impact on the outer surface.

The glass sheets shown in FIGS. 1a and 1b are 50 mm×50 mm ion exchanged alkali aluminosilicate glass plates, each sample having a thickness of 0.5 mm. Each of the samples had a composition of either 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % $MgO$; 0.46 mol % $CaO$; 0.01 mol % $ZrO_2$; 0.34 mol % $As_2O_3$; and 0.007 mol % $Fe_2O_3$; or 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % $MgO$; 0.58 mol % $CaO$; 0.01 mol % $ZrO_2$; 0.21 mol % $SnO_2$; and 0.007 mol % $Fe_2O_3$.

Referring to FIG. 1a, glass plate a (FIG. 1a) can be classified as being frangible. In particular, glass plate a fragmented into multiple small pieces that were ejected, and exhibited a large degree of crack branching from the initial crack to produce the small pieces. Approximately 50% of the fragments are less than 1 mm in size, and it is estimated that about 8 to 10 cracks branched from the initial crack. Glass pieces were also ejected about 5 cm from original glass plate a, as seen in FIG. 1a. A glass article that exhibits any of the three criteria (i.e., multiple crack branching, ejection, and extreme fragmentation) described hereinabove is classified as being frangible. For example, if a glass exhibits excessive branching alone but does not exhibit ejection or extreme fragmentation as described above, the glass is still characterized as frangible. Glass plates b, c, (FIG. 1b) and d (FIG. 1a) are classified as not frangible. In each of these samples, the glass sheet has broken into a small number of large pieces. Glass plate b (FIG. 2b), for example, has broken into two large pieces with no crack branching; glass plate c (FIG. 2b) has broken into four pieces with two cracks branching from the initial crack; and glass plate d (FIG. 2a) has broken into four pieces with two cracks branching from the initial crack. Based on the absence of ejected fragments (i.e., no glass pieces forcefully ejected more than 2 inches from their original location), no visible fragments$\leq 1$ mm in size, and the minimal amount of observed crack branching, samples b, c, and d are classified as non-frangible or substantially non-frangible.

Based on the foregoing, a frangibility index (Table 1) can be constructed to quantify the degree of frangible or non-frangible behavior of a glass, glass ceramic, and/or a ceramic article upon impact with another object. Index numbers, ranging from 1 for non-frangible behavior to 5 for highly frangible behavior, have been assigned to describe different levels of frangibility or non-frangibility. Using the index, frangibility can be characterized in terms of numerous parameters: 1) the percentage of the population of fragments having a diameter (i.e., maximum dimension) of less than 1 mm ("Fragment size" in Table 1); 2) the number of fragments formed per unit area (in this instance, $cm^2$) of the sample ("Fragment density" in Table 1); 3) the number of cracks branching from the initial crack formed upon impact ("Crack branching" in Table 1); and 4) the percentage of the population of fragments that is ejected upon impact more than about 5 cm (or about 2 inches) from their original position ("Ejection" in Table 1).

TABLE 1

| Criteria for determining the degree of frangibility and frangibility index. | | | | | |
|---|---|---|---|---|---|
| Degree of frangibility | Frangibility index | Fragment size (% $\leq$ 1 mm) | Fragment density (fragments/$cm^2$) | Crack branching | Ejection (% $\geq$ 5 cm) |
| High | 5 | >20 | >7 | >9 | >6 |
| Medium | 4 | 10 < n $\leq$ 20 | 5 < n $\leq$ 7 | 7 < n $\leq$ 9 | 4 < n $\leq$ 6 |
| Low | 3 | 5 < n $\leq$ 10 | 3 < n $\leq$ 5 | 5 < n $\leq$ 7 | 2 < n $\leq$ 4 |
| None | 2 | 0 < n $\leq$ 5 | 1 < n $\leq$ 3 | 2 < n $\leq$ 5 | 0 < n $\leq$ 2 |
|  | 1 | 0 | n $\leq$ 1 | n $\leq$ 2 | 0 |

A frangibility index is assigned to a glass article if the article meets at least one of the criteria associated with a particular index value. Alternatively, if a glass article meets criteria between two particular levels of frangibility, the article may be assigned a frangibility index range (e.g., a frangibility index of 2-3). The glass article may be assigned the highest value of frangibility index, as determined from the individual criteria listed in Table 1. In many instances, it is not possible to ascertain the values of each of the criteria, such as the fragmentation density or percentage of fragments ejected more than 5 cm from their original position, listed in Table 1. The different criteria are thus considered individual, alternative measures of frangible behavior and the frangibility index such that a glass article falling within one criteria level will be assigned the corresponding degree of frangibility and frangibility index. If the frangibility index based on any of the four criteria listed in Table 1 is 3 or greater, the glass article is classified as frangible.

Applying the foregoing frangibility index to the samples shown in FIGS. 1a and 1b, glass plate a fragmented into multiple ejected small pieces and exhibited a large degree of crack branching from the initial crack to produce the small pieces. Approximately 50% of the fragments are less than 1 mm in size and it is estimated that about 8 to 10 cracks branched from the initial crack. Based upon the criteria listed in Table 1, glass plate a has a frangibility index of between about 4-5, and is classified as having a medium-high degree of frangibility.

A glass article having a frangibility index of less than 3 (low frangibility) may be considered to be non-frangible or substantially non-frangible. Glass plates b, c, and d each lack fragments having a diameter of less than 1 mm, multiple branching from the initial crack formed upon impact and fragments ejected more than 5 cm from their original position. Glass plates b, c, and d are non-frangible and thus have a frangibility index of 1 (not frangible).

As previously discussed, the observed differences in behavior between glass plate a, which exhibited frangible behavior, and glass plates b, c, and d, which exhibited non-frangible behavior, in FIGS. 1a and 1b can be attributed to differences in central tension CT among the samples tested. The possibility of such frangible behavior is one consideration in designing various glass products, such as cover plates or windows for portable or mobile electronic devices such as cellular phones, entertainment devices, and the like, as well as for displays for information terminal (IT) devices, such as laptop computers. Moreover, the depth of the compression layer DOL and the maximum value of compressive stress CS that can be designed into or provided to a glass article are limited by such frangible behavior.

Accordingly, in order to avoid frangibility, a glass article should be designed to have a central tension CT at or below a critical or threshold central tension CT for the glass article to avoid frangibility upon impact with another object, while taking both compressive stress CS and depth of layer DOL into account. Based on empirical observations of the frangible behavior of glass articles having thicknesses greater than or equal to about 2 mm, the relationship between the "critical" or "threshold" amount of central tension that produces unacceptable frangible behavior and the glass thickness t was heretofore believed to be linear. An example of the threshold central tension CT (also referred to herein as the "threshold CT") at which the onset (also referred to herein as the "critical" or "threshold" central tension value) of unacceptable frangible behavior was believed to occur is plotted as a function of thickness t in FIG. 2 (line 2).

Figure 2:
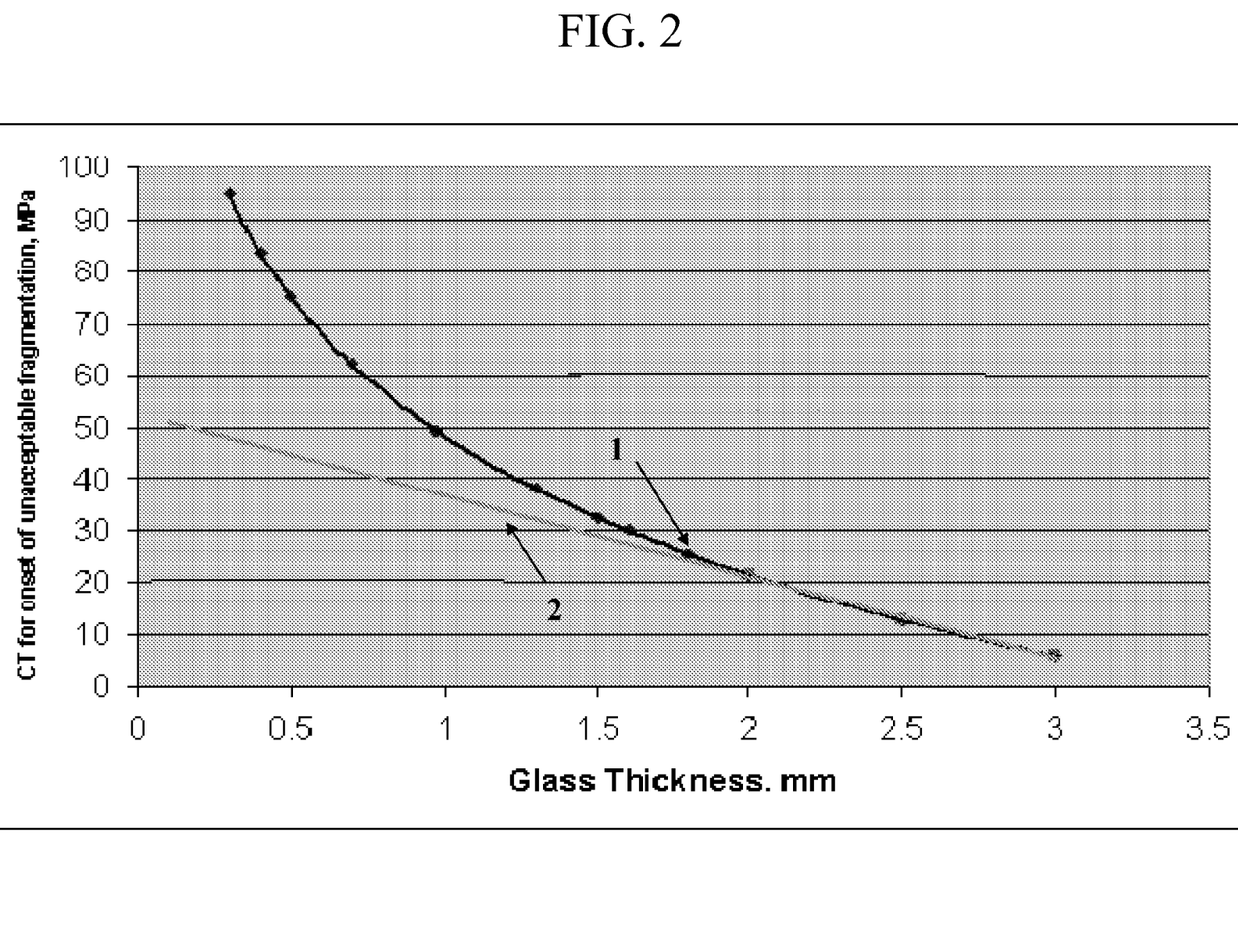
FIG. 2 includes plots of threshold central tension as a function of glass thickness for strengthened alkali aluminosilicate glass articles.

The data represented by line 2 shown in FIG. 2 are based upon behavior that was experimentally observed for a series of chemically strengthened alkali aluminosilicate glass samples, having a composition of either 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % $MgO$; 0.46 mol % $CaO$; 0.01 mol % $ZrO_2$; 0.34 mol % $As_2O_3$; and 0.007 mol % $Fe_2O_3$; or 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % $MgO$; 0.58 mol % $CaO$; 0.01 mol % $ZrO_2$; 0.21 mol % $SnO_2$; and 0.007 mol % $Fe_2O_3$, that had been strengthened by ion exchange. Each of the samples had a thickness of at least 2 mm. The data represented by line 2 in FIG. 2 indicate that the relationship between the threshold central tension CT (as determined from equation (1) and CS, DOL, and t) and thickness t of the glass is linear (referred to hereinafter as "linear threshold central tension $CT_2$," or "$CT_2$") and is described by the equation:

$$CT_2(\text{MPa}) = -15.7\ (\text{MPa/mm}) \cdot t(\text{mm}) + 52.5\ (\text{MPa}) \qquad (2).$$

Equation (2) is derived from experimental compressive stress and depth of layer data that were obtained for chemically strengthened glass samples, each having a thickness of at least 2 mm. Extrapolated to lesser thicknesses, equation (2) provides a lower limit of CT for the strengthened glasses described herein. Due to the relationship between central tension, compressive stress, and depth of layer derived from data obtained for samples in which thickness $t \geq 2$ mm and expressed in equation (2), the linear behavior of the threshold $CT_2$ with respect to thickness t limits the amount of compressive stress and depth of layer that may be created. Consequently, design flexibility for certain applications, particularly those in which thinner sheets of glass are used, would be expected to be limited based upon such expected linear behavior. For example, glass sheets would be strengthened to achieve the CS and DOL values to achieve a central tension that is below the threshold $CT_2$ value predicted by equation (2) and illustrated by line 2 in FIG. 2.

Figure 3:
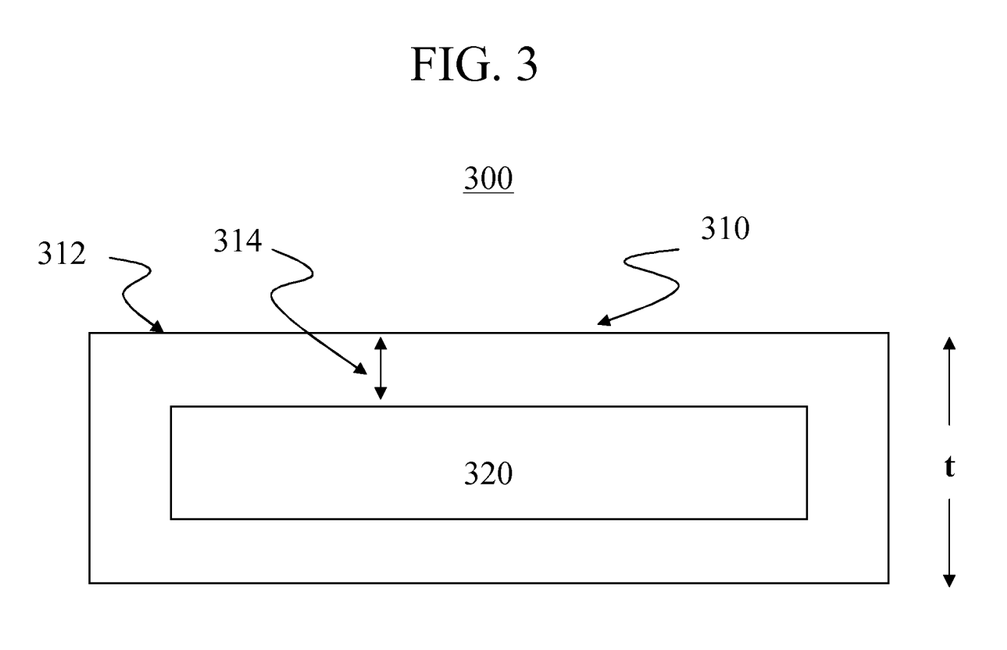
FIG. 3 is a schematic representation of a strengthened glass article.

As described herein, the relationship between the critical or threshold amount of central tension CT that produces frangible behavior in strengthened glass articles and, in particular, glass articles having a thickness t of less than 2 mm, has been found to be nonlinear. Accordingly, a strengthened glass article, such as a strengthened sheet or plate that is substantially non-frangible (i.e., free of frangible behavior), as defined by the criteria described herein, is provided, and schematically shown in FIG. 3. Strengthened glass article 300 has a thickness t, an outer region 310 extending from surface 312 to a depth of layer 314, and an inner region 320. Outer region 310 of glass article 300 is strengthened (i.e., thermally or chemically strengthened) so as to be under a compressive stress CS. The compressive stress CS in outer region 310 gives rise to a central tension CT, or tensile stress, in inner region 320, which balances the compressive stress. The depth of the compressive stress layer DOL 314 is the depth from the surface to the point where the measured compression stress is reduced to zero stress at the boundary with the tensile stress zone (inner region 320). The relationship between central tension CT and compressive stress CS is given by equation (1), previously presented:

$$CT = (CS \cdot DOL)/(t - 2DOL) \qquad (1).$$

Referring to FIG. 2, a threshold central tension (threshold CT) at which the onset (also referred to herein as the critical or threshold central tension) of unacceptable frangible behavior actually occurs is plotted as a function of thickness t and represented by line 1 in FIG. 2. Line 1 is based upon experimentally observed behavior of alkali aluminosilicate glasses having a composition of either 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$; or 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$ that had been ion exchanged. The data represented by line 1 indicates that the relationship between central tension CT (referred to hereinafter as "nonlinear threshold central tension $CT_1$" or "$CT_1$") and thickness t of the glass is actually non-linear and described by the equation $$CT_1 (MPa) \leq -38.7\ (MPa/mm) \cdot \ln(t)(mm) + 48.2\ (MPa) \quad (3).$$

Equation (3) is derived from experimental measurements of compressive stresses CS and depths of layer DOL of ion exchanged alkali aluminosilicate glass samples, each having a thickness of less than about 1.4 mm. It has been observed that glass articles have a nonlinear threshold central tension $CT_1$ that is greater than the linear central tension $CT_2$ defined by the previously expected linear relationship between CT and t represented by equation (2). An unexpected range of central tension $CT_1$ in which unacceptable frangible behavior is minimized or absent is therefore described by the equation $$-15.7\ (MPa/mm) \cdot t(mm) + 52.5\ (MPa) \leq CT_1(MPa) \leq -38.7\ (MPa/mm) \cdot \ln(t)(MPa) + 48.2\ (MPa) \quad (4).$$

The nonlinear relationship between the allowable maximum $CT_1$ with glass article thickness, exemplified by line 1 of FIG. 2 and equation (3) is unexpected in light of behavior previously observed for thicker strengthened glass samples of similar or identical compositions. If the relationship between CT and thickness were linear ($CT_2$), as demonstrated by line 2 of FIG. 2 and expressed in equation (2), the CT threshold frangibility for part thicknesses ranging from about 0.2 up to 2 mm would be less than that determined from equation (3), and at least one of CS and DOL would be correspondingly limited. The depth of the compression layer (DOL) and maximum value of compressive stress CS at low thicknesses would also have to be reduced. Such reductions in CS and DOL in these ranges, as dictated by the linear behavior shown in FIG. 2, would limit design flexibility for certain applications.

The previously expected linear behavior of the threshold CT ($CT_2$, expressed by line 2 of FIG. 2) provides no suggestion of a non-linear relationship between the actual threshold CT limit ($CT_1$) for frangibility t (line 1 of FIG. 2) as a function of thickness. To further illustrate this unexpected result, Table 2 lists the actual nonlinear threshold central tension $CT_1$ calculated using equation (3) from line 1 of FIG. 2, described herein, the linear threshold central tension $CT_2$ calculated using equation (2) from line 2 of FIG. 2, and the difference between the threshold CT values ($CT_1-CT_2$) calculated using equations (2) and (3) for glass selected thicknesses.

TABLE 2

| t (mm) | $CT_1$ $-38.7 \ln(t) + 48.2$ (MPa) | $CT_2$ $-15.7 t + 52.5$ (MPa) | $(CT_1 - CT_2)$ $(-38.7 \ln(t) + 48.2) - (-15.7 t + 52.5)$ (MPa) |
|---|---|---|---|
| 1.5 | 32.5 | 28.9 | 3.6 |
| 1.25 | 37.6 | 32.9 | 4.7 |
| 1.0 | 48.2 | 36.8 | 11.4 |
| 0.75 | 59.3 | 40.7 | 18.6 |
| 0.5 | 75.0 | 44.7 | 30.4 |
| 0.3 | 94.8 | 47.8 | 47.0 |

As can be seen from the values listed in Table 2, the difference ($CT_1-CT_2$) between the expected threshold $CT_2$ predicted by the linear relationship (equation (2)) and the actual threshold $CT_1$ predicted by the nonlinear relationship (equation (3)) increases with decreasing thickness t. As CT is related to thickness t, depth of layer DOL, and compressive stress CS (equation (1)), the greater threshold CT values predicted by the nonlinear relationship ($CT_1$; equation (3)) described herein provide a greater range of CS and DOL values that may be used to design and prepare a strengthened glass sheet that exhibits non-frangible behavior; i.e., has a frangibility index that is less than 3. As a result, non-frangible strengthened glass articles can be made at certain thicknesses and strengthened so as to have a greater threshold central tension CT than previously believed possible.

In one embodiment, the strengthened glass article 300 is substantially non-frangible, or free of frangible behavior, as described hereinabove. That is, strengthened glass article 300 has a frangibility index, as described in Table 1 herein, of less than 3. Upon impact with a force sufficient to cause fragmentation of strengthened glass 300, the percentage $n_1$ of the population of the fragments having a diameter (i.e., maximum dimension) of less than or equal to 1 mm ("Fragment size" in Table 1) is less than or equal to 5% (i.e., $0\% \leq n_1 \leq 5\%$); the number of fragments formed per unit area (in this instance, $cm^2$) $n_2$ of the sample ("Fragment density" in Table 1) is less than or equal to 3 fragments/$cm^2$; the number of cracks $n_3$ branching from the initial crack formed upon impact ("Crack branching" in Table 1) is less than or equal to 5 (i.e., $0 \leq n_3 \leq 5$); and the percentage of the population of fragments $n_4$ that is ejected upon impact more than about 5 cm (or about 2 inches) from their original position ("Ejection" in Table 1) is less than or equal to 2% (i.e., $0\% \leq n_4 \leq 2\%$).

The data shown in line 2 of FIG. 1 provide no suggestion of non-linear behavior of the threshold CT limit $CT_1$ for frangibility as a function of thickness. As can be seen from the values listed in Table 2, the difference between the threshold CT predicted by equation (2) and the threshold CT predicted by the nonlinear relationship (equation 3) increases with decreasing thickness t.

The strengthened glass articles described herein may comprise numerous compositions. In one embodiment, the strengthened glass article comprises an alkali aluminosilicate glass. In some embodiments, the alkali aluminosilicate glass comprises, consists essentially of, or consists of: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $\leq Li_2O+Na_2O+K_2O \leq 20$ mol % and 0 mol % $\leq$ MgO+CaO $\leq 10$ mol %. In some embodiments, the alkali aluminosilicate glass may further comprise up 8 mol % MgO, and/or 0 mol % $< SnO_2 \leq 1$ mol %. In other embodiments, the alkali aluminosilicate glass comprises, consists essentially of, or consists of: 64 mol % $\leq SiO_2 \leq 68$ mol %; 12 mol % $\leq Na_2O \leq 16$ mol %; 8 mol % $\leq Al_2O_3 \leq 12$ mol %; 0 mol % $\leq B_2O_3 \leq 3$ mol %; 2 mol % $\leq K_2O \leq 5$ mol %; 4 mol % $\leq$ MgO $\leq 6$ mol %; and 0 mol % $\leq$ CaO $\leq 5$ mol %, wherein: 66 mol % $\leq SiO_2+B_2O_3+CaO \leq 69$ mol %; $Na_2O+K_2O+B_2O_3+MgO+CaO+SrO>10$ mol %; 5 mol % $\leq$ MgO+CaO+SrO $\leq 8$ mol %; $(Na_2O+B_2O_3)-Al_2O_3 \leq 2$ mol %; 2 mol % $\leq Na_2O-Al_2O_3 \leq 6$ mol %; and 4 mol % $\leq (Na_2O+K_2O)-Al_2O_3 \leq 10$ mol %. In a third embodiment, the alkali aluminosilicate glass comprises, consists essentially of, or consists of: 5-50 wt % $SiO_2$; 2-20 wt % $Al_2O_3$; 0-15 wt % $B_2O_3$; 1-20 wt % $Na_2O$; 0-10 wt % $Li_2O$; 0-10 wt % $K_2O$; and 0-5 wt %

(MgO+CaO+SrO+BaO); 0-3 wt % (SrO+BaO); and 0-5 wt % (ZrO$_2$+TiO$_2$), wherein 0≦(Li$_2$O+K$_2$O)/Na$_2$O≦0.5.

In one particular embodiment, the alkali aluminosilicate glass has the composition: 66.7 mol % SiO$_2$; 10.5 mol % Al$_2$O$_3$; 0.64 mol % B$_2$O$_3$; 13.8 mol % Na$_2$O; 2.06 mol % K$_2$O; 5.50 mol % MgO; 0.46 mol % CaO; 0.01 mol % ZrO$_2$; 0.34 mol % As$_2$O$_3$; and 0.007 mol % Fe$_2$O$_3$. In another particular embodiment, the alkali aluminosilicate glass has the composition: 66.4 mol % SiO$_2$; 10.3 mol % Al$_2$O$_3$; 0.60 mol % B$_2$O$_3$; 4.0 mol % Na$_2$O; 2.10 mol % K$_2$O; 5.76 mol % MgO; 0.58 mol % CaO; 0.01 mol % ZrO$_2$; 0.21 mol % SnO$_2$; and 0.007 mol % Fe$_2$O$_3$. The alkali aluminosilicate glasses described hereinabove are, in some embodiments, substantially free of lithium, whereas in other embodiments, the alkali aluminosilicate glass is substantially free of at least one of arsenic, antimony, and barium.

Non-limiting examples of such alkali aluminosilicate glasses are described in U.S. patent application Ser. No. 11/888,213, by Adam J. Ellison et al., entitled "Down-Drawable, Chemically Strengthened Glass for Cover Plate," filed on Jul. 31, 2007, which claims priority from U.S. Provisional Patent Application 60/930,808, filed on May 22, 2007, and having the same title; U.S. patent application Ser. No. 12/277,573, by Matthew J. Dejneka et al., entitled "Glasses Having Improved Toughness and Scratch Resistance," filed on Nov. 25, 2008, which claims priority from U.S. Provisional Patent Application 61/004,677, filed on Nov. 29, 2007, and having the same title; U.S. patent application Ser. No. 12/392,577, by Matthew J. Dejneka et al., entitled "Fining Agents for Silicate Glasses," filed Feb. 25, 2009, which claims priority from U.S. Provisional Patent Application No. 61/067,130, filed Feb. 26, 2008, and having the same title; U.S. patent application Ser. No. 12/393,241 by Matthew J. Dejneka et al., entitled "Ion-Exchanged, Fast Cooled Glasses," filed Feb. 26, 2009, which claims priority from U.S. Provisional Patent Application No. 61/067,732, filed Feb. 29, 2008, and having the same title, the contents of which are incorporated herein by reference in their entirety.

In one embodiment, the glass articles described herein, such as glass article 300, are chemically strengthened by ion exchange. In this process, ions in the surface layer of the glass are replaced by—or exchanged with—larger ions having the same valence or oxidation state. In those embodiments in which the glass article comprises, consists essentially of, or consists of an alkali aluminosilicate glass, ions in the surface layer of the glass and the larger ions are monovalent alkali metal cations, such as Li$^+$ (when present in the glass), Na$^+$, K$^+$, Rb$^+$, and Cs$^+$. Alternatively, monovalent cations in the surface layer may be replaced with monovalent cations other than alkali metal cations, such as Ag$^+$ or the like.

Ion exchange processes are typically carried out by immersing a glass article in a molten salt bath containing the larger ions to be exchanged with the smaller ions in the glass. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the glass as a result of the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 16 hours. However, temperatures and immersion times different from those described above may also be used. Such ion exchange treatments typically result in strengthened alkali aluminosilicate glasses having depths of layer ranging from about 10 μm up to at least 50 μm with a compressive stress ranging from about 200 MPa up to about 800 MPa, and a central tension of less than about 100 MPa.

Non-limiting examples of ion exchange processes are provided in the U.S. patent applications and provisional patent applications that have been previously referenced hereinabove. In addition, non-limiting examples of ion exchange processes in which glass is immersed in multiple ion exchange baths, with washing and/or annealing steps between immersions, are described in U.S. Provisional Patent Application No. 61/079,995, by Douglas C. Allan et al., entitled "Glass with Compressive Surface for Consumer Applications," filed Jul. 11, 2008, in which glass is strengthened by immersion in multiple, successive, ion exchange treatments in salt baths of different concentrations; and U.S. Provisional Patent Application No. 61/084,398, by Christopher M. Lee et al., entitled "Dual Stage Ion Exchange for Chemical Strengthening of Glass," filed Jul. 29, 2008, in which glass is strengthened by ion exchange in a first bath is diluted with an effluent ion, followed by immersion in a second bath having a smaller concentration of the effluent ion than the first bath. The contents of U.S. Provisional Patent Application Nos. 61/079,995 and No. 61/084,398 are incorporated herein by reference in their entirety.

In one embodiment, the glass is down-drawable by processes known in the art, such as slot-drawing, fusion drawing, re-drawing, and the like, and has a liquidus viscosity of at least 130 kilopoise.

In some embodiments, the strengthened glass article has a thickness of up to about 2 mm, and, in a particular embodiment, the thickness is in a range from about 0.2 mm up to about 2 mm. In another embodiment, the thickness of the glass article is in a range from about 0.5 mm up to about 0.75 mm and, in another embodiment, from about 0.9 mm up to about 2 mm. In one particular embodiment, the strengthened glass article outer region has a depth of layer of at least 30 μm and a compressive stress of at least 600 MPa.

Methods of making a strengthened glass article that is substantially non-frangible, or free of frangible behavior, (i.e., having a frangibility index, as described herein, of less than 3) is also provided. A glass article having a thickness t is first provided. The glass article, in one embodiment, is an alkali aluminosilicate glass, such as those described hereinabove. A compressive stress CS is created in an outer region of the glass article to strengthen the glass article. The compressive stress CS is sufficient to generate a central tension CT in a central region of the glass article such that CT(MPa)≦−38.7 (MPa/mm)·ln(t)(mm)+48.2 (MPa). In one embodiment, compressive stress CS is sufficient to generate a central tension CT in a central region of the glass article such that −15.7 (MPa/mm)·t(mm)+52.5 (MPa)≦CT(MPa)≦−38.7 (MPa/mm)·ln(t)(mm)+48.2 (MPa).

In one embodiment, the compressive stress is created by chemically strengthening the glass article, for example, by the ion exchange processes, previously described herein, in which a plurality of first metal ions in the outer region of the glass article is exchanged with a plurality of second metal ions so that the outer region comprises the plurality of the second metal ions. Each of the first metal ions has a first ionic radius and each of the second alkali metal ions has a second ionic radius. The second ionic radius is greater than the first ionic radius, and the presence of the larger second alkali metal ions in the outer region creates the compressive stress in the outer region.

At least one of the first metal ions and second metal ions are preferably ions of an alkali metal. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion.

Strengthened glass articles (such as glass article 300, shown in FIG. 3) 300 can be used as a protective cover plate (as used herein, the term "cover plate" includes windows or the like) for display and touch screen applications, such as, but not limited to, portable communication and entertainment devices such as telephones, music players, video players, or the like; and as a display screen for information-related terminal (IT) (e.g., portable or laptop computers) devices; as well as in other applications.

While typical embodiments have been set forth for the purpose of illustration, the foregoing description should not be deemed to be a limitation on the scope of the disclosure or appended claims. For example, processes other than ion exchange may be used to chemically strengthen the glass, and different means of strengthening the glass may be used in combination with each other to achieve compressive stress within the glass. In one alternative embodiment, metal ions, such as silver or the like, may be used instead of—or in combination with—alkali metal ions in the ion exchange process. Accordingly, various modifications, adaptations, and alternatives may occur to one skilled in the art without departing from the spirit and scope of the present disclosure or appended claims.

The invention claimed is:

1. A strengthened glass article, the strengthened glass article having a thickness t<0.5 mm and comprising:
   an outer region having a depth of layer of at least 30 μm and a compressive stress of at least 600 MPa,
   an inner region, wherein the inner region is under a central tension CT, and wherein CT(MPa)>15.7 (MPa/mm)·t(mm)+52.5 (MPa) and wherein the strengthened glass article has a frangibility index of less than 3.

2. The strengthened glass article of claim 1, wherein the strengthened glass article has a thickness t<0.5 mm.

3. The strengthened glass article of claim 2, wherein when the strengthened glass article is broken by the point impact, the strengthened glass article exhibits at least one of fragment size $n_1$ (%≦1 mm) of 0%≦$n_1$≦5%, fragment density $n_2$ (fragments/cm$^2$) of 0 fragments/cm$^2$≦$n_2$≦3 fragments/cm$^2$, crack branching $n_3$ of 0≦$n_3$≦5 and ejection $n_4$ (%≧5 cm) of 0%≦$n_4$≦2%, or combinations thereof.

4. The strengthened glass article of claim 2, wherein the strengthened glass article is substantially non-frangible when subjected to a point impact that is sufficient to break the strengthened glass article.

5. The strengthened glass article according to claim 2, wherein the strengthened glass article is an alkali aluminosilicate glass comprising: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $Li_2O$+$Na_2O$+$K_2O$≦20 mol %.

6. The strengthened glass article of claim 5, wherein the alkali aluminosilicate glass further comprises 0 mol %≦MgO+CaO≦10 mol %.

7. The strengthened glass article of claim 6, wherein the alkali aluminosilicate glass further comprises up to 8 mol % MgO.

8. The strengthened glass article of claim 1, wherein t is between 0.3 mm and 0.5 and CT is between about 75.0 and about 94.8 MPa.

9. The strengthened glass article of claim 2, wherein the thickness of the strengthened glass article is 0.3≦t<0.5 mm.

10. The strengthened glass article of claim 9, wherein when the strengthened glass article is broken by the point impact, the strengthened glass article exhibits at least one of fragment size $n_1$ (%≦1 mm) of 0%≦$n_1$≦5%, fragment density $n_2$ (fragments/cm$^2$) of 0 fragments/cm$^2$≦$n_2$≦3 fragments/cm$^2$, crack branching $n_3$ of 0≦$n_3$≦5 and ejection $n_4$ (%≧5 cm) of 0%≦$n_4$≦2%, or combinations thereof.

11. The strengthened glass article of claim 9, wherein the strengthened glass article is substantially non-frangible when subjected to a point impact that is sufficient to break the strengthened glass article.

12. The strengthened glass article according to claim 9, wherein the strengthened glass article is an alkali aluminosilicate glass comprising: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≦$Li_2O$+$Na_2O$+$K_2O$≦20 mol %.

13. The strengthened glass article of claim 12, wherein the alkali aluminosilicate glass further comprises 0 mol %≦MgO+CaO≦10 mol %.

14. The strengthened glass article of claim 13, wherein the alkali aluminosilicate glass further comprises up to 8 mol % MgO.

15. A strengthened glass article, the strengthened glass article having a thickness t≦0.5 mm and comprising:
   an outer region having a depth of layer of at least 30 μm and a compressive stress of at least 600 MPa; and
   an inner region under a central tension CT, wherein CT (MPa)>15.7 (MPa/mm)·t(mm)+52.5 (MPa),
   wherein the strengthened glass article is substantially non-frangible when subjected to a point impact that is sufficient to break the strengthened glass article, and wherein the strengthened glass article has a frangibility index of less than 3, and wherein when the strengthened glass article is broken by the point impact, the strengthened glass article exhibits at least one of fragment size $n_1$ (%≦1 mm) of 0%≦$n_1$≦5%, fragment density $n_2$ (fragments/cm$^2$) of 0 fragments/cm$^2$≦$n_2$≦3 fragments/cm$^2$, crack branching $n_3$ of 0≦$n_3$≦5 and ejection $n_4$ (%≧5 cm) of 0%≦$n_4$2%, or combinations thereof.

16. The strengthened glass article of claim 15, wherein the strengthened glass article having a thickness t≦0.5 mm.

17. The strengthened glass article according to claim 16, wherein the strengthened glass article is an alkali aluminosilicate glass comprising: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $Li_2O$+$Na_2O$+$K_2O$≦20 mol %.

18. The strengthened glass article of claim 17, wherein the alkali aluminosilicate glass further comprises 0 mol % MgO+CaO−10 mol %.

19. The strengthened glass article of claim 16, wherein the alkali aluminosilicate glass further comprises up to 8 mol % MgO.

20. The strengthened glass article of claim 16, wherein the thickness of the strengthened glass article is 0.3≦t≦0.5 mm.

21. The strengthened glass article according to claim 20, wherein the strengthened glass article is an alkali aluminosilicate glass comprising: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $Li_2O+Na_2O+K_2O$≦20 mol %.

22. The strengthened glass article of claim 21, wherein the alkali aluminosilicate glass further comprises 0 mol %≦MgO+CaO≦10 mol %.

23. The strengthened glass article of claim 22, wherein the alkali aluminosilicate glass further comprises up to 8 mol % MgO.

24. The strengthened glass article of claim 15, wherein t is between 0.3 mm and 0.5 and CT is between about 75.0 and about 94.8 MPa.

* * * * *

UNITED STATES PATENT AND TRADEMARK OFFICE
CERTIFICATE OF CORRECTION

PATENT NO. : 8,415,013 B2
APPLICATION NO. : 13/451684
DATED : April 9, 2013
INVENTOR(S) : Barefoot et al.

It is certified that error appears in the above-identified patent and that said Letters Patent is hereby corrected as shown below:

All "$\leqq$" in the following sections should read as --$\leq$--:
In the Specification: Col. 1, Line 35; Col. 1, Line 38; Col. 1, Line 42; Col. 1, Line 50; Col. 3, Line 27; Col. 4, Line 33; Col. 4, Lines 62-65, Table 1; Col. 7, Line 14; Col 7, Line 25; Col 8, Line 26; Col 8, Line 31; Col. 8, Line 34; Col. 8, Line 51; Col. 8, Lines 54-64; Col. 9, Line 2; Col. 10, Line 53; Col. 10, Line 57;
In the Claims: Col. 11, Line 49, Claim 3; Col. 11, Line 63, Claim 5; Col. 11, Line 66, Claim 6; Col. 12, Line 8, Claim 9; Col. 12, Line 13, Claim 10; Col. 12, Line 27, Claim 12; Col. 12, Line 30, Claim 13; Col. 12, Line 36, Claim 15; Col. 12, Line 48, Claim 15; Col. 12, Line 53, Claim 16; Col. 12, Line 60, Claim 17; and Col. 13, Line 13, Claim 22; and In the Specification:

Col. 6, Line 27, "thickness $t \geqq 2$ mm" should read --thickness $t \geq 2$ mm--; and In the Claims:

Col. 11, Line 37, Claim 1, "$t < 0.5$ mm" should read --$t \leq 0.5$ mm--; and

Col. 11, Line 41, Claim 1, "CT(MPa) > 15.7(MPa/mm)·t(mm) + 52.5(MPa)" should read
--CT(MPa) > –15.7(MPa/mm)·t(mm) + 52.5(MPa)--; and Col. 12, Line 39, Claim 15, "CT(MPa) > 15.7(MPa/mm)·t(mm) + 52.5(MPa)" should read
--CT(MPa) > –15.7(MPa/mm)·t(mm) + 52.5(MPa)--; and Col. 12, Line 63, Claim 18, "0 mol% MgO + CaO –10 mol%." should read
--0 mol% $\leq$ MgO + CaO $\leq$ 10 mol%.--; and Signed and Sealed this
Twenty-second Day of October, 2013

Teresa Stanek Rea
*Deputy Director of the United States Patent and Trademark Office*

Col 13, Line 2, Claim 20, "article is $0.3 \leq t \leq 0.5$ mm." should read
--article is $0.3 \leq t < 0.5$ mm.--; and Col. 13, Line 9, Claim 21, "wherein 12 mol% $Li_2O + Na_2O + K_2O \leq 20$ mol%." should read
--wherein 12 mol% $\leq Li_2O + Na_2O + K_2O \leq 20$ mol%.--.